No. 787,623. PATENTED APR. 18, 1905.
D. J. HOOD.
DEVICE FOR HANDLING TALKING MACHINE NEEDLES.
APPLICATION FILED JULY 6, 1903.

WITNESSES:
F. J. Hartman
Chas. K. Bennett

INVENTOR
Delaware J. Hood.
BY
J. W. Metcalf
ATTORNEY.

No. 787,623.                                                Patented April 18, 1905.

UNITED STATES PATENT OFFICE.

DELAWARE J. HOOD, OF PHILADELPHIA, PENNSYLVANIA, ASSIGNOR TO VICTOR TALKING MACHINE COMPANY, A CORPORATION OF NEW JERSEY.

DEVICE FOR HANDLING TALKING-MACHINE NEEDLES.

SPECIFICATION forming part of Letters Patent No. 787,623, dated April 18, 1905.

Application filed July 6, 1903. Serial No. 164,278.

*To all whom it may concern:*

Be it known that I, DELAWARE J. HOOD, a citizen of the United States, and a resident of the city of Philadelphia, State of Pennsylvania, have invented certain new and useful Improvements in Devices for Handling Talking-Machine Needles, of which the following is a full, clear, and complete disclosure.

The object of my invention is to produce a device which will obviate the necessity of withdrawing talking-machine needles from boxes or other receptacles in which they are placed by means of the fingers.

In talking-machines of the disk type it is usual and necessary to change the needle or stylus-point after each selection has been played, because of the fact that the points are slightly worn or ground off and would more or less injure a record-groove should the same be used a second time to produce the same or a different selection. Talking-machine needles being small and having a sharp end, they are difficult to pick up singly by the fingers, but when once held in the fingers may be easily inserted into the stylus-bar. The device which is the subject-matter of the present invention overcomes this difficulty by depositing the needles separately in a shallow tray, from which they may be easily removed.

Briefly, my invention comprises a magnet movably mounted upon a suitable base or upon the casing or cabinet of a talking-machine and which is adapted to remove needles successively from a receptacle, also carried by said support, and to deposit said needles in a suitable place or holder, so that they may be easily grasped by the fingers.

For a full, clear, and exact description of my invention reference may be had to the following specification, and to the accompanying drawings, forming part thereof, in which—

Figure 2:
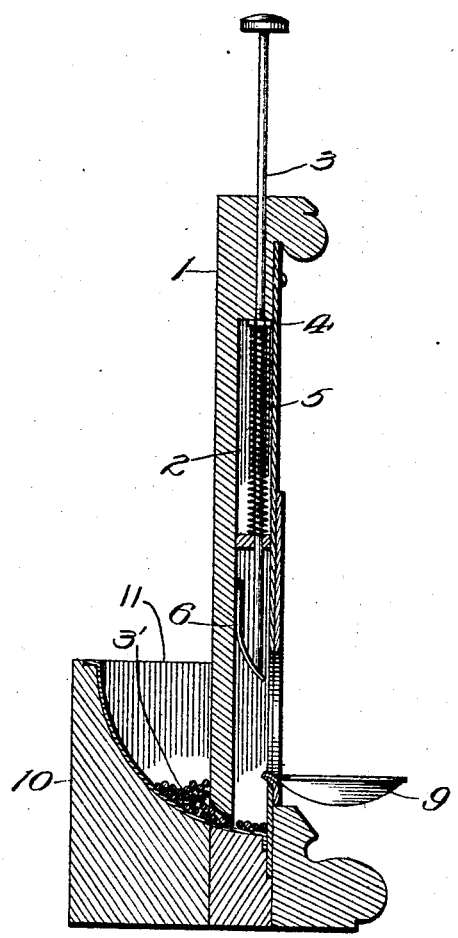
Figure 1:
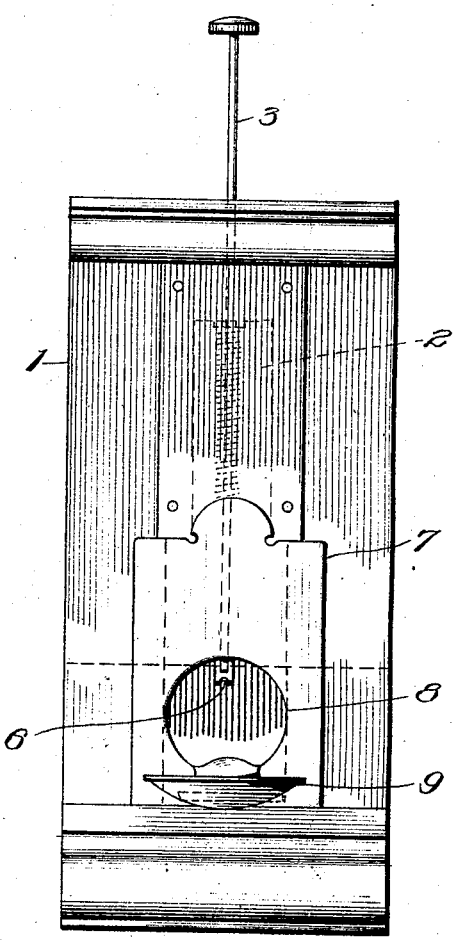

Figure 1 is a front elevation of my device, showing the same in connection with a portion of a casing for a talking-machine motor; and Fig. 2, a longitudinal sectional view of the device as shown in Fig. 1.

Referring to the drawings, the numeral 1 indicates a portion of the casing for the talking-machine motor, said casing having a recess 2 therein, which at its lower portion forms a receptacle for the needle and communicates with the interior of said casing, as indicated at 3'. Within the recess 2 a magnetic rod or pin 3 is located in such a manner that the same may reciprocate vertically, said pin being adapted to be retained in a raised position by a collar 4 and coil-spring 5. Said rod 3 is preferably magnetized for its whole length, but may consist of two portions, one of which only is magnetized. Within the recess 2 adjacent its lower portion a curved spring 6 is provided which has a notch or recess 7 at its lower end. This spring is fastened to the inner wall of said recess, and its lower notched end projects into the path of the magnetic rod 3, so that when said pin is in its raised position said spring 6 will project slightly below its end.

The recess 2 in the casing 1 is covered in any suitable manner; but at its lower end I have shown a plate 7', having an opening 8 therein, to the lower edge of which is attached the shallow pan or receptacle 9. The opening 3' in the casing 1 is adapted to coöperate with a recessed block 10, so as to form a wedge-shaped receptacle or hopper for the talking-machine needles, as indicated at 11.

In the operation of my device the recess or hopper 11 in the block 10 is filled or partially filled with talking - machine needles which are to be used upon the sound-box in the usual manner. These needles pass to the lower part of the said hopper, and several of them pass through the opening 3' into the lower end of the recess 2, which in this position are in alinement with the end of the magnetic rod 3. When it is desired to obtain a new needle, the magnetic pin or rod 3 is depressed until its end attracts one of said needles, and said pin is then allowed to move upwardly until the end of the spring 6 has passed over the end of said magnetic pin, thereby disengaging the needle therefrom and at the same time giving it a slight impulse outwardly, so that it will be deposited in the pan 9. The needle then may be easily grasped by the fingers and placed within the stylus-bar of the sound-box.

The spring 6 is preferably of brass or other ordinary non-magnetic material, as are also the other parts, excepting the rod or pin 3.

Changes may be made in the form, proportion, and arrangement of my device without departing from the spirit and scope of my invention. The magnetic portion of the device may be made to reciprocate in any direction which may suit choice or convenience and also may be made in different forms which will be substantially equivalents of that herein shown, so long as the reciprocating selecting feature is retained.

Having thus described my invention, what I claim, and desire to protect by Letters Patent of the United States, is—

1. A device for handling talking-machine needles, comprising a support, a magnetic selector movably carried thereby and a receptacle adjacent said support, which said selector is adapted to enter to successively remove needles therefrom.

2. A device for handling talking-machine needles, comprising a support, a magnetic selector movably carried thereby, a hopper adjacent said support, and a receptacle adapted to receive needles from said hopper, said selector being adapted to enter said receptacle and to successively remove needles therefrom.

3. A device for handling talking-machine needles, comprising a support, a magnetic selector movably carried thereby, a receptacle fixed to said support with which said selector is adapted to coöperate to successively remove needles therefrom and means for detaching needles from said selector.

4. A device for handling talking-machine needles, comprising a support or casing, a magnetic selector carried by said support and adapted to reciprocate thereon, a receptacle carried by said support and adapted to have the needles removed therefrom by said selector, means for detaching needles from said selector and a secondary receptacle adapted to receive the needles when detached from said selector.

5. A device for handling talking-machine needles, comprising a support or casing, a magnetic selector carried thereby and adapted to reciprocate thereon, a hopper, a receptacle having communication with said hopper and adapted to be entered by said selector to remove needles therefrom, a stripper for said selector, and a secondary receptacle adapted to receive needles when detached from said selector.

6. A device for handling talking-machine needles, comprising a part having a wedge-shaped recess, there being an opening in the lower portion thereof, means located adjacent said opening to receive needles therefrom, a magnetic selector adapted to withdraw the needles from said part, means for detaching needles from said selector and a secondary receptacle adapted to receive said needles successively when detached from said selector.

7. A device for handling talking-machine needles, comprising a support, a magnetic selector carried thereby, and adapted to reciprocate thereon, a spring having one end in contact with said selector so as to detach needles therefrom, a receptacle for the needles, which said selector is adapted to enter, so that the needles are attracted and held thereby and a secondary receptacle for the needles.

8. A device for handling talking-machine needles, in combination with the casing of a talking-machine, of a receptacle for said needles, means to permit needles to be delivered to the exterior of said casing, a magnetic selector attached to said casing and adapted to coöperate with said means to successively remove needles therefrom.

9. A device for handling talking-machine needles, in combination with the casing of a talking-machine, of a storage-receptacle for said needles located within said casing, said receptacle having communication with the exterior of said casing, means for receiving needles from said storage-receptacle, a magnetic selector adapted to enter said receiving means and raising needles therefrom, means for detaching needles from said selector and a secondary receptacle for receiving the needles so detached.

10. A device for handling talking-machine needles, in combination with a casing of a talking-machine, of a needle-receptacle attached thereto, a magnetized bar also attached thereto and adapted to reciprocate thereon, a spring for holding said bar in its inoperative position, said bar being adapted to coöperate with said receptacle to successively remove the needles therefrom.

In witness whereof I have hereunto set my hand this 3d day of July, A. D. 1903.

DELAWARE J. HOOD.

Witnesses:
 LEWIS H. VAN DUSEN,
 CHAS. K. BENNETT.